(12) United States Patent
Mather et al.

(10) Patent No.: US 8,919,847 B2
(45) Date of Patent: Dec. 30, 2014

(54) DEPLOYABLE CENTER CONSOLE

(71) Applicants: Carl Mather, Lake Orion, MI (US);
Kenric P. Socks, Leonard, MI (US)

(72) Inventors: Carl Mather, Lake Orion, MI (US);
Kenric P. Socks, Leonard, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 0 days.

(21) Appl. No.: 13/633,462

(22) Filed: Oct. 2, 2012

(65) Prior Publication Data

US 2014/0091589 A1    Apr. 3, 2014

(51) Int. Cl.
*B60R 13/00*    (2006.01)

(52) U.S. Cl.
USPC .................................. 296/24.34; 296/37.8

(58) Field of Classification Search
CPC .............. B60R 2011/0007; B60R 2011/0082; B60R 2011/0075; B60R 13/0262
USPC ............................................. 296/37.8, 24.34
See application file for complete search history.

(56) References Cited

U.S. PATENT DOCUMENTS

| | | | |
|---|---|---|---|
| 5,599,054 A * | 2/1997 | Butz et al. | 296/37.8 |
| 6,135,529 A | 10/2000 | DeAngelis et al. | |
| 7,156,438 B2 * | 1/2007 | Cowelchuk et al. | 296/24.34 |
| 7,641,252 B2 * | 1/2010 | Sturt et al. | 296/24.34 |
| 7,891,623 B2 | 2/2011 | Haddad et al. | |
| 2002/0175531 A1 | 11/2002 | Worrell et al. | |
| 2005/0269843 A1 | 12/2005 | McGowan et al. | |
| 2010/0051616 A1 * | 3/2010 | Shea et al. | 220/4.28 |
| 2010/0078954 A1 | 4/2010 | Liu et al. | |
| 2011/0127791 A1 * | 6/2011 | Penner | 296/24.34 |

FOREIGN PATENT DOCUMENTS

| | | |
|---|---|---|
| DE | 4438909 C1 | 3/1996 |
| EP | 0189051 A2 | 7/1986 |
| EP | 0219632 A1 | 4/1987 |
| GB | 2466699 A | 7/2010 |

OTHER PUBLICATIONS

International Search Report dated Nov. 26, 2013 for International Application No. PCT/US2013/060608, International Filing Date Sep. 19, 2013.
Written Opinion dated Nov. 26, 2013 for International Application No. PCT/US2013/060608, International Filing Date Sep. 19, 2013.

* cited by examiner

*Primary Examiner* — Joseph D Pape
*Assistant Examiner* — Dana Ivey
(74) *Attorney, Agent, or Firm* — Ralph E. Smith

(57) ABSTRACT

A storage console for a vehicle is provided and may include a housing movable from a stowed position to an upright position. The housing may include a top surface that is substantially flush with a floor of the vehicle in the stowed position and is spaced apart from the floor in the upright position.

21 Claims, 9 Drawing Sheets

DEPLOYABLE CENTER CONSOLE

FIELD

The present disclosure relates to storage consoles and more particularly to a reconfigurable storage console for a vehicle.

BACKGROUND

Minivans and sport-utility vehicles typically include passenger compartments that provide ample seating positions and large cargo areas. Further, such passenger compartments are often reconfigurable to selectively permit an increase/decrease in the number of seating locations, repositioning of the seating locations, and/or an increase/decrease in the size of the cargo area of the vehicle.

For example, minivans may include second-row seat assemblies and third-row seat assemblies that may be moved from a stowed position to a use position to tailor the passenger compartment of the minivan to the particular needs of the user. As such, should the user require additional storage to accommodate large or bulky items, one or both of the seat assemblies may be moved into the stowed position to increase the cargo area of the vehicle. Conversely, should the user require additional seating locations, each of the seat assemblies may be moved into the use position to accommodate each passenger.

Moving the seat assemblies from the use position to the stowed position typically involves moving seats of the particular seat assembly into a well formed in a floor pan of the vehicle to increase the cargo area of the vehicle and/or to allow access to rearward seating locations. In minivan applications, second-row seat assemblies typically include a pair of separately movable seats that are received within individual wells formed in the floor pan. The individual wells are typically required, as a single well extending width-wise across the vehicle is not possible due to an upwardly extending "tunnel" formed in the floor pan that accommodates a portion of the drivetrain of the vehicle.

While individual wells adequately receive the second-row seats in the stowed position, the area between the second-row seats and above the tunnel is not utilized. The area above the well is simply used as a load floor to store cargo when the second-row seats are in the stowed position and is used as a passageway to gain access to the third-row seat assembly when the second-row seats are in the use position.

SUMMARY

A storage console for a vehicle is provided and may include a housing movable from a stowed position to an upright position. The housing may include a top surface that is substantially flush with a floor of the vehicle in the stowed position and is spaced apart from the floor in the upright position.

In another configuration, a vehicle is provided and may include a floor pan defining a vehicle floor, a first seat assembly supported by the floor pan, a second seat assembly supported by the floor pan, and a storage console disposed between the first seat assembly and the second seat assembly. The storage console may include a housing movable between a stowed position and an upright position. The housing may include a top surface that is substantially flush with the vehicle floor when the housing is in the stowed position and is spaced apart from the vehicle floor when the housing is in the upright position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

With reference to the figures, a storage console 10 for a vehicle 12 is provided. The storage console 10 may include a housing 14 that is movable from a stowed position (FIGS. 2 and 3) to an upright position (FIGS. 9 and 10) to configure a passenger compartment 16 of the vehicle 12 to fit the needs of the particular user. For example, the housing 14 may be moved into the stowed position to allow the housing 14 to act as a load floor of the vehicle 12. Conversely, the housing 14 may be positioned in the upright position to allow the housing 14 to store large or bulky items, as will be described in detail below.

Figure 1:
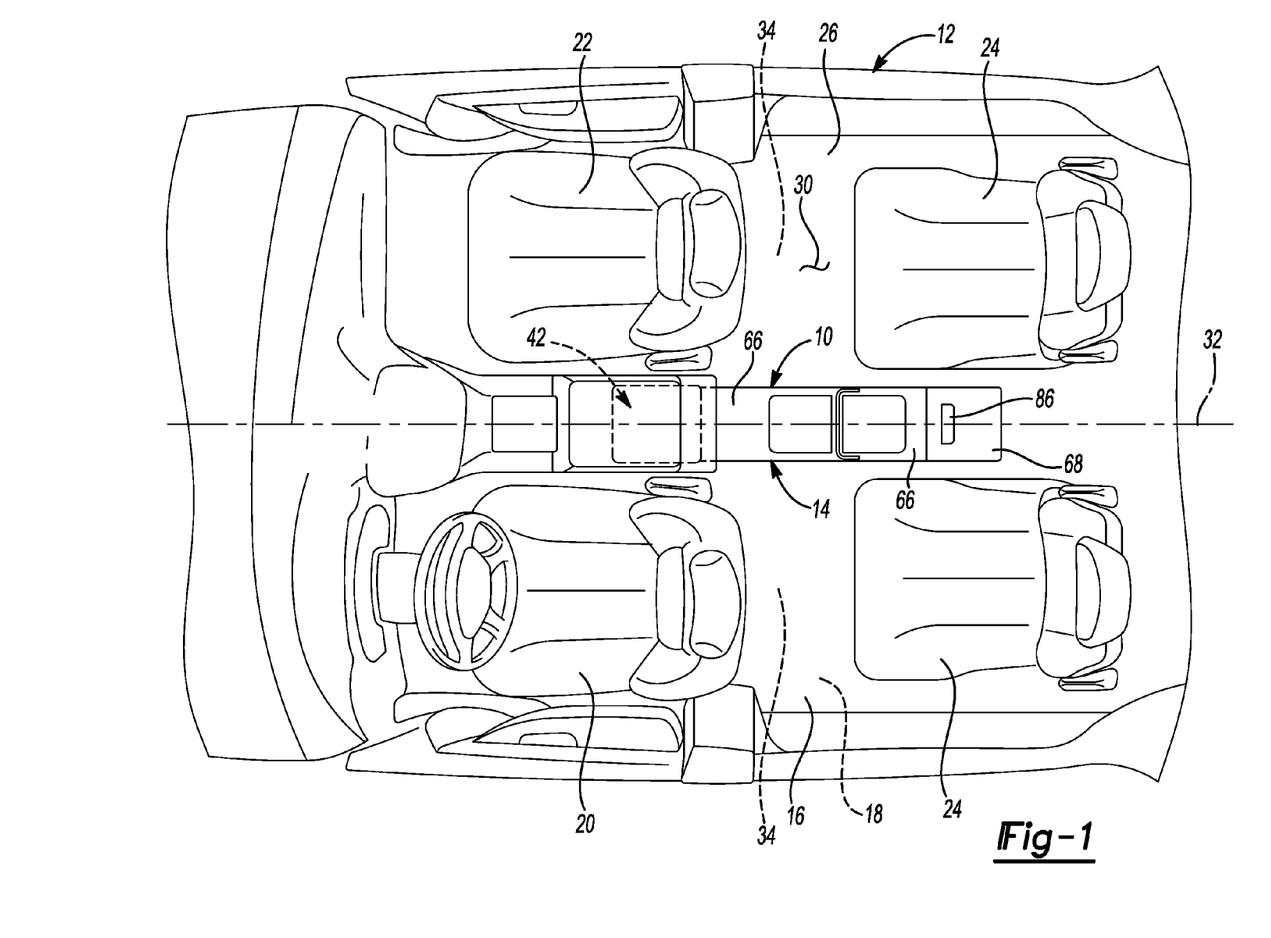
FIG. 1 is a partial top view of a vehicle incorporating a storage console in accordance with the principles of the present disclosure.
Figure 4:
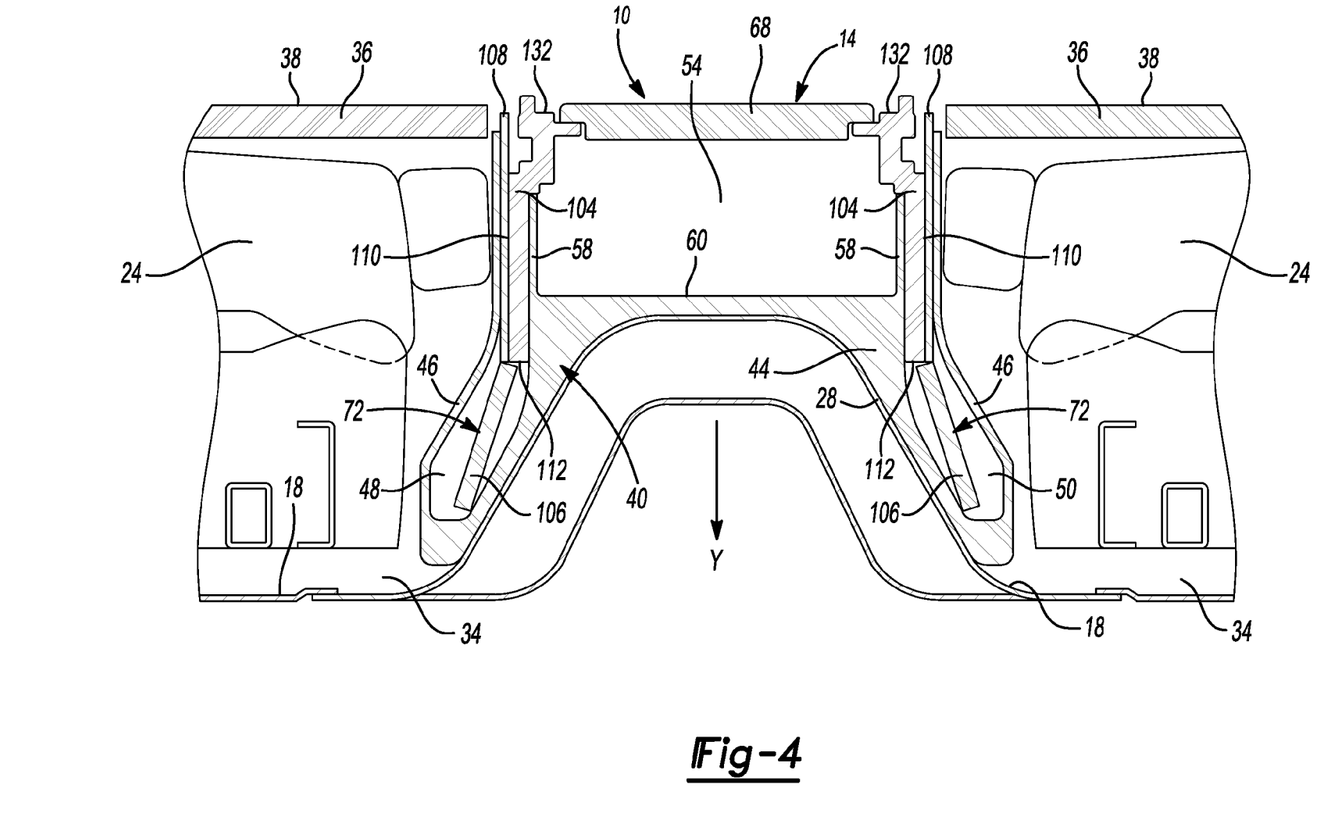
FIG. 4 is a cross-sectional view of the vehicle and storage console of FIG. 1 *a* taken along line 4-4 of FIG. 2.
Figure 5:
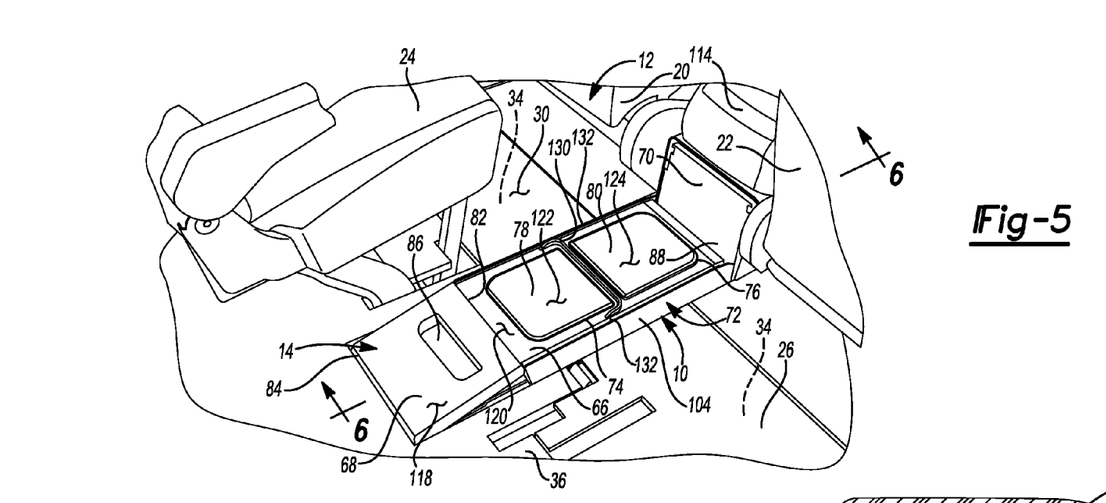
FIG. 5 is a partial perspective view of the vehicle of FIG. 1 showing the storage console in a partial upright position.

With particular reference to FIGS. 1 and 4, the vehicle 12 is shown to include a floor pan 18 supporting a driver's seat 20, a passenger seat 22, and a pair of second-row seats 24. The floor pan 18 may extend substantially across the passenger compartment 16 and may provide the passenger compartment 16 with a load floor 26 and a tunnel 28 (FIG. 4). The load floor 26 may cover the passenger compartment 16 and may serve as the floor of the vehicle 12. Accordingly, the load floor 26 may include a load surface 30 that supports people and cargo during use of the vehicle 12.

The tunnel 28 may extend along a longitudinal axis 32 (FIG. 1) of the vehicle 12 to accommodate various components of a drive train (none shown) of the vehicle 12. The tunnel 28 may be formed by the floor pan 18 and may extend in a direction toward the load surface 30 of the load floor 26. In so doing, the tunnel 28 forms a pair of wells 34 (FIG. 4) into which the second-row seats 24 may be positioned when the second-row seats 24 are moved from a use position (FIG. 1) to a stowed position (FIG. 4).

In operation, the second-row seats 24 may be positioned in an upright and use position (FIG. 1) to allow the seats 24 to accommodate passengers. The second-row seats 24 may be moved from the use position to the stowed position (FIG. 4) by folding the seats 24 into the respective wells 34 formed by the floor pan 18 such that the seats 24 are disposed on opposite sides of the tunnel 28. Positioning the second-row seats 24 in the respective wells 34 moves the seats 24 into the stowed position and provides the passenger compartment 16 with additional cargo space.

When one or both of the second-row seats 24 are moved from the use position to the stowed position, a panel 36 may be positioned over each well 34 to conceal the seat 24 disposed therein. The panel 36 may be aligned with the load floor 26 of the vehicle 12 such that a load surface 38 of the panel 36 is substantially flush with the load surface 30 of the load floor 26. As such, when one or both of the second-row seats 24 are disposed within respective wells 34 of the floor pan 18 and the panels 36 are placed over the wells 34, the load surface 38 of each panel 36 may cooperate with the load surface 30 of the load floor 26 to provide the passenger compartment 16 with a substantially flat floor on which to store cargo.

Figures 2, 3:
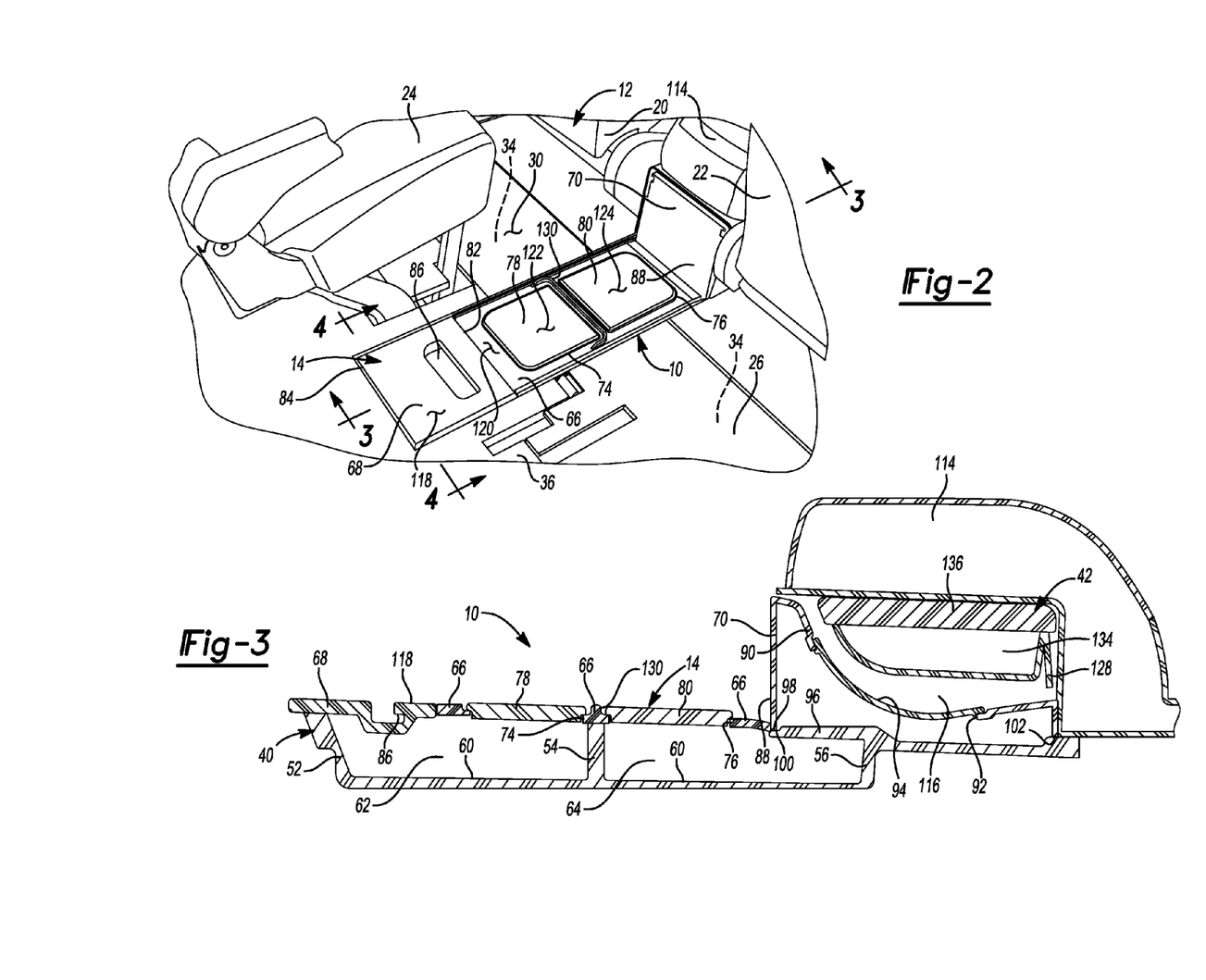
FIG. 2 is a partial perspective view of the vehicle of FIG. 1 showing the storage console in a stowed position.
FIG. 3 is a cross-sectional view of the storage console of FIG. 2 taken along line 3-3.

The storage console 10 may be disposed between the second-row seats 24 and may cooperate with the load floor 26 and the panels 36 to provide the passenger compartment 16 with a substantially flat floor when the storage console 10 is in the stowed position (FIGS. 2-4). The storage console 10 may include a support bracket 40 extending along a length of the storage console 10 and an armrest 42. The support bracket 40 may support the housing 14 when the housing 14 is in the stowed position and when the housing 14 is in the upright position.

The support bracket 40 may include a base 44 that is fixedly attached to the floor pan 18 at the tunnel 28 and a pair of arms 46. The base 44 may be attached to the tunnel 28 via a fastener and/or via a structural adhesive, for example. The arms 46 may be integrally formed with the support bracket 40 and may be disposed on opposite sides of the tunnel 28 to define a first opening 48 and a second opening 50. The openings 48, 50 may be formed between the base 44 and the arms 46 and may receive a portion of the housing 14 therein when the housing 14 is in the stowed position.

The support bracket 40 may additionally include a first wall 52, a second wall 54, and a third wall 56 extending between and formed substantially perpendicular to sidewalls 58 of the support bracket 40. Each of the walls 52, 54, 56, and 58 may extend from the support bracket 40 in a direction away from the tunnel 28 and may be formed substantially perpendicular to a bottom surface 60 of the support bracket 40 (FIGS. 3 and 4).

When the support bracket 40 is installed in the floor pan 18 of the vehicle 12, a portion of the base 44 is disposed on opposite sides of the tunnel 28 such that the arms 46 are likewise disposed on opposite sides of the tunnel 28. As such, the first opening 48 and the second opening 50 are disposed on opposite sides of the tunnel 28 to accommodate the housing 14 when the housing 14 is in the stowed position. Further, when the support bracket 40 is attached to the floor pan 18, the walls 52, 54, 56, 58 extend in a direction generally away from the tunnel 28 and toward the load floor 26. While the walls 52, 54, 56, 58 extend away from the tunnel 28 and toward the load floor 26, the walls 52, 54, 56, 58 may not extend past the load surface 30 of the load floor 26 to provide a first storage area 62 and a second storage area 64 that are each disposed beneath the load surface 30. As such, the first storage area 62 and the second storage area 64 are each positioned lower than the load floor 26 and are defined generally between the housing 14 and the bottom surface 60 of the support bracket 40.

Figure 10:
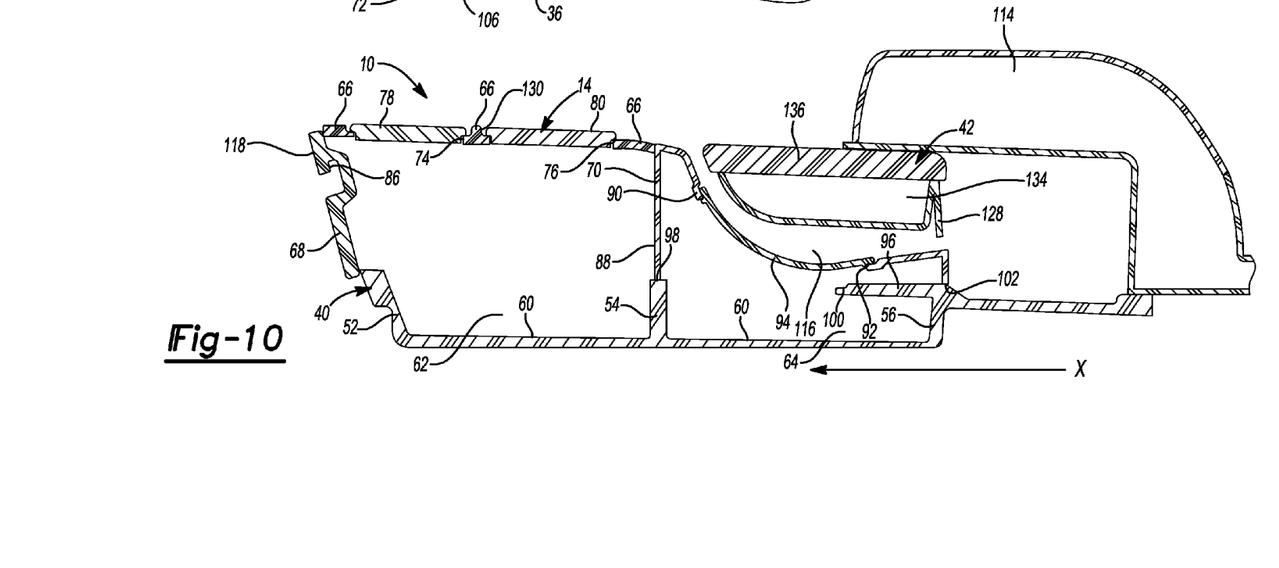
FIG. 10 is a cross-sectional view of the storage console of FIG. 9 taken along line 10-10 of FIG. 9.

The housing 14 may include a top panel 66, a rear panel 68, a forward panel 70, and a pair of sidewalls 72. The top panel 66 may include a first opening 74 and a second opening 76 that respectively allow access to the first storage area 62 and the second storage area 64 when the housing 14 is in the stowed position (FIG. 3) and allow access to the first storage area 62 when the housing 14 is in the upright position (FIG. 10). The first opening 74 may include an access door 78 movable between a closed state preventing access to the first storage area 62 and an open state permitting access to the first storage area 62. Likewise, the second opening 76 may include an access door 80 movable between a closed state restricting access to the second storage area 64 and an open state permitting access to the second storage area 64.

As described, when the access doors 78, 80 are in the closed state and the housing 14 is in the stowed position (FIG. 3), access to the first storage area 62 via the first opening 74 and access to the second storage area 64 via the second opening 76 is restricted. Access to the first storage area 62 and access to the second storage area 64 may be achieved by moving the respective access doors 78, 80 into the open state. When the housing 14 is moved from the stowed position to the upright position, access to the first storage area 62 is permitted when either or both of the access doors 78, 80 are in the open state to permit access via one or both of the first opening 74 and the second opening 76.

The rear panel 68 may be pivotably attached to the top panel 66 at a first end 82 and may be pivotably attached to the load floor 26 at a second end 84 to permit movement of the housing 14 between the stowed position and the upright position. The rear panel 68 may include a handle 86 that allows a force to be applied to the rear panel 68 and, thus, to the top panel 66 and forward panel 70 to move the housing 14 from the stowed position (FIG. 3) to the upright position (FIG. 10).

Figure 6:
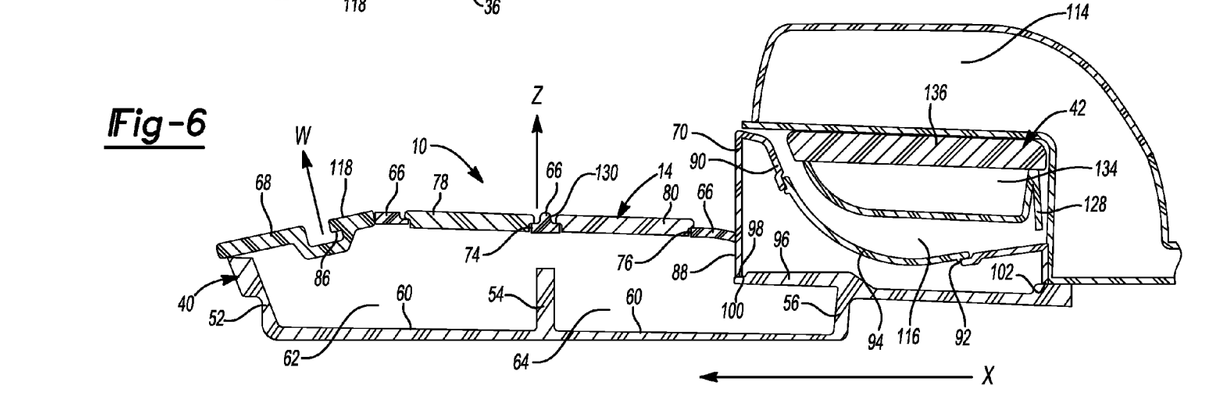
FIG. 6 is a cross-sectional view of the storage console of FIG. 5 taken along line 6-6 of FIG. 5.

The forward panel 70 may be positioned at an opposite end of the top panel 66 than the rear panel 68 and may be slideably attached to the top panel 66 at a wall 88 of the forward panel 70. Allowing the wall 88 of the forward panel 70 to be slideably attached to the top panel 66 allows the forward panel 70 to move in the (X) direction (FIGS. 6, 8, 10) as the housing 14 is moved from the stowed position to the upright position, as will be described in greater detail below.

Figure 15:
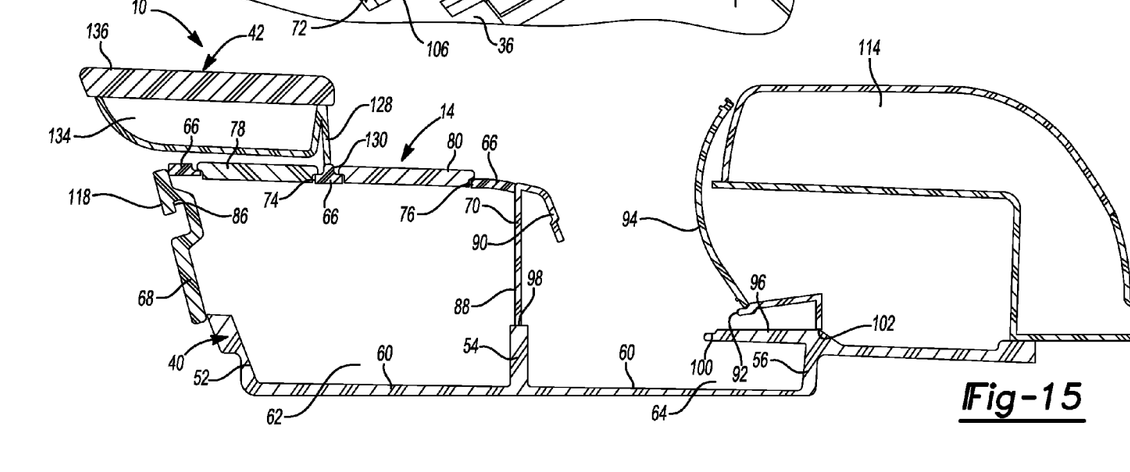
FIG. 15 is a cross-sectional view of the storage console of FIG. 14 taken along line 15-15 of FIG. 14.

The wall 88 may be integrally formed with a top wall 90 having an opening 92. The opening 92 may include an access door 94 that is movable from an open state to a closed state to provide selective access through the opening 92 when the housing 14 is moved from the stowed position to the upright position. Namely, when the housing 14 is moved into the upright position, access to the second storage area 64 may be obtained via the opening 92 when the access door 94 is moved from the closed state to the open state (FIG. 15).

When the housing 14 is in the stowed position, the forward panel 70 may be supported by an extension 96 of the support bracket 40. Specifically, a distal end 98 of the wall 88 of the forward panel 70 may be in contact with the extension 96 of the support bracket 40 and may be received within a channel 100 of the extension 96 to define a stop that properly positions the forward panel 70 relative to the support bracket 40 when the housing 14 is in the stowed position. Likewise, a distal end 102 of the top wall 90 may likewise be in contact with the support bracket 40 to support the top wall 90 and wall 88 when the housing 14 is in the stowed position.

The sidewalls 72 may each include a fixed wall 104 and a movable wall 106 pivotably attached to the fixed wall 104. The fixed wall 104 may additionally include a trim component 108 fixed for movement with the wall 104 that provides a class "A" surface for the housing 14 when the housing 14 is in the upright position. While the fixed wall 104 is described and shown as including a trim component 108, the class "A" surface provided by the trim component 108 could alternatively be provided by an outer surface 110 of the fixed wall 104, thereby obviating the need for the trim panel 108.

In one configuration, the movable walls 106 are pivotably attached to an end 112 of the respective fixed walls 104 to allow the movable walls 106 to pivot about and relative to the ends 112 of the fixed walls 104. Allowing the movable walls 106 to pivot relative to the fixed wall 104 allows the housing 14 to be moved from the upright position to the stowed position, as the movable walls 106 account for the tunnel 28. Namely, as the housing 14 is moved from the upright position to the stowed position, the sidewalls 72 are respectively received within the first opening 48 and the second opening 50 of the support bracket 40. Because the first opening 48 and the second opening 50 are formed between the support bracket 40 and the arms 46 and, further, because the support bracket 40 and the arms 46 follow the contour of the tunnel 28, the movable walls 106 must move away from one another to allow the sidewalls 72 to be received within the first opening 48 and the second opening 50 when the housing 14 is moved into the stowed position (FIG. 4). In other words, the movable walls 106 move in opposite directions and away from one another to account for the increasing width of the tunnel 28 in the (Y) direction (FIG. 4).

When the housing 14 is moved from the stowed position to the upright position, the movable walls 106 are once again permitted to pivot about the ends 112 of the fixed walls 104 and move toward one another to allow the housing 14 to be moved from the stowed position to the upright position. Once the housing 14 is sufficiently moved from the stowed position to the upright position, the movable walls 106 may be fixed relative to the fixed walls 104 to provide the housing 14 with sidewalls 72 that support the housing 14 when the in the upright position.

The armrest 42 may be slideably supported by the housing 14 and may be moved from a stowed position (FIG. 3) to a use position (FIGS. 11 and 12) when the housing 14 is moved from the stowed position to the use position. When the housing 14 is in the stowed position, the armrest 42 may be disposed between the top wall 90 of the forward panel 70 and an armrest 114 associated with the driver's seat 20 and the passenger seat 22. Namely, the armrest 42 may be received within a compartment 116 (FIG. 6) defined generally between the top wall 90 of the forward panel 70 and the armrest 114 disposed between the driver's seat 20 and the passenger seat 22.

When the housing 14 is moved from the stowed position (FIG. 3) to the use position (FIG. 10), the forward panel 70 and, thus, the top wall 90, move in the (X) direction (FIG. 8), thereby causing the armrest 42 to likewise move in the (X) direction. Upon sufficient movement of the forward panel 70 and armrest 42 in the (X) direction, sufficient clearance exists between the top wall 90 and the armrest 114 to allow the armrest 42 to be moved relative to the housing 14 and into the use position (FIG. 12), as will be described in greater detail below.

With reference to the figures, operation of the storage console 10 will be described in detail. When the housing 14 is in the stowed position (FIG. 3), access to the first storage area 62 may be achieved via the first opening 74 by moving the access door 78 from the closed state to the open state. Likewise, access to the second storage area 64 may be achieved via the second opening 76 by moving the access door 80 from the closed state to the open state. When the housing 14 is in the stowed position, access to the armrest 42 is prohibited by the forward panel 70, as the armrest 42 is disposed generally within the armrest 114 between the armrest 114 and the top wall 90. In short, the armrest 42 is hidden from view by the forward panel 70 when the housing 14 is in the stowed position.

When the housing 14 is in the stowed position, an outer surface 118 of the rear panel 68 and an outer surface 120 of the top panel 66 may be substantially flush with the load surfaces 38 of the panels 36. Likewise, an outer surface 122 of the access door 78 and an outer surface 124 of the access door 80 may likewise be substantially flush with the outer surfaces 118, 120 and the load surfaces 38. As such, the housing 114—via the top panel 66, the rear panel 68, the access door 78, and the access door 80—may cooperate with the load surfaces 38 of the panels 36 to provide the passenger compartment 16 with a substantially flat load floor when the housing 14 is in the stowed position.

A force may be applied to the housing 14 at the handle 86 to move the housing 14 from the stowed position (FIG. 3) to the upright position. The force applied to the handle 86 may be in the (W) direction (FIG. 6) to concurrently move the housing 14 in the (X) direction and the (Z) direction. When the housing 14 is moved in the (X) direction and the (Z) direction, the top panel 66 and the rear panel 68 are likewise moved in the (X, Z) directions. Further, engagement between the top panel 66 and the forward panel 70 causes the forward panel 70 to move in the (X) direction, as the top panel 66 exerts a force on the forward panel 70 in the (X) direction. As the top panel 66 moves in the (X, Z) directions, the top panel 70 continues to apply a force on the forward panel 70 in the (X) direction while concurrently moving relative to and along the forward panel 70 in the (Z) direction. Specifically, the top panel 66 slides along the forward panel 70 at a junction of the top panel 66 and the forward panel 70 as the top panel 66 moves in the (X, Z) directions.

Figures 7, 8:
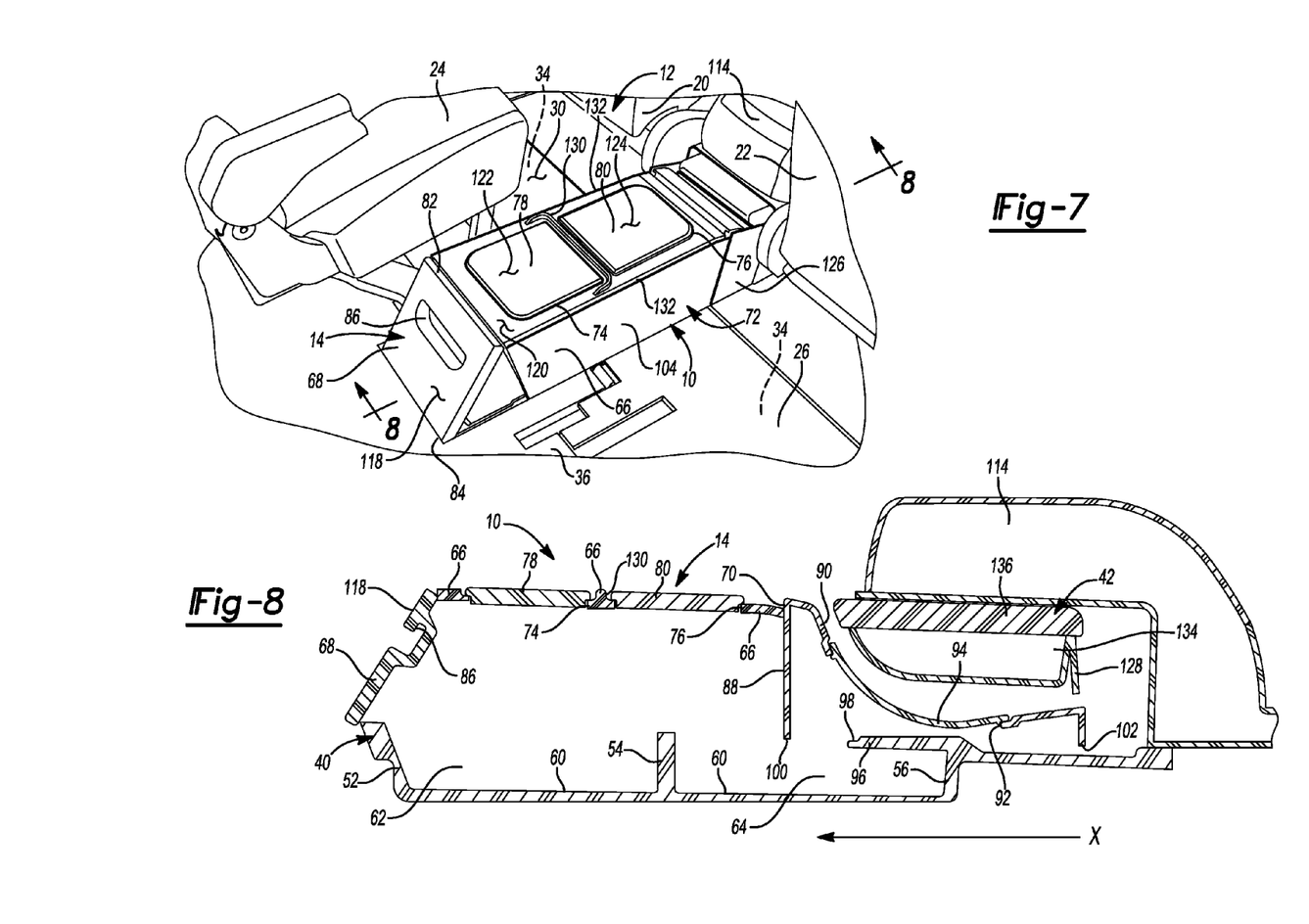
FIG. 7 is a partial perspective view of the vehicle of FIG. 1 showing the storage console in a partial upright position.
FIG. 8 is a cross-sectional view of the storage console of FIG. 7 taken along line 8-8 of FIG. 7.

With particular reference to FIGS. 7 and 8, the housing 14 is shown approximately between the stowed position and the upright position. At this point, the force applied to the handle 86 is maintained to continue movement of the top panel 66 and the rear panel 68 in the (X, Z) directions. Such movement of the top panel 66 and the rear panel 68 likewise causes the forward panel 70 to move in the (X) direction which, in turn, causes the armrest 42 to move in the (X) direction.

Figure 9:
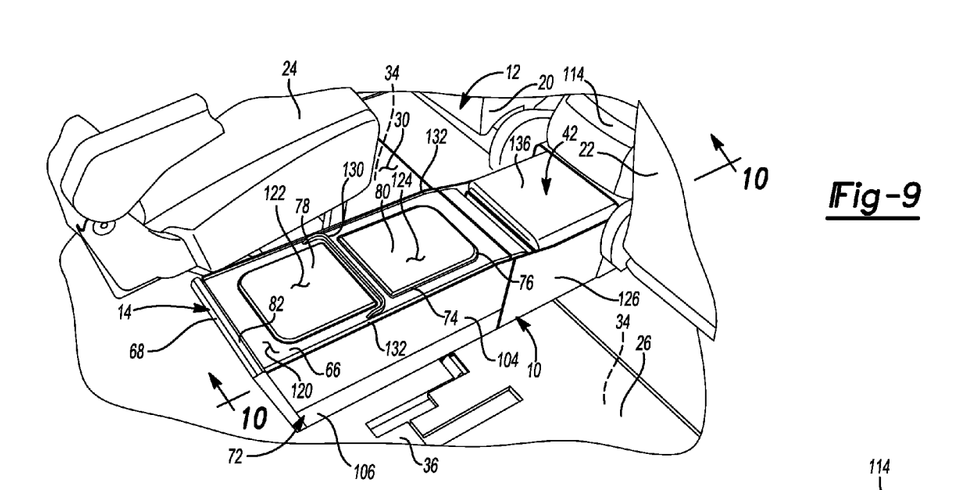
FIG. 9 is a partial perspective view of the vehicle of FIG. 1 showing the storage console in an upright position.
Figures 11, 12:
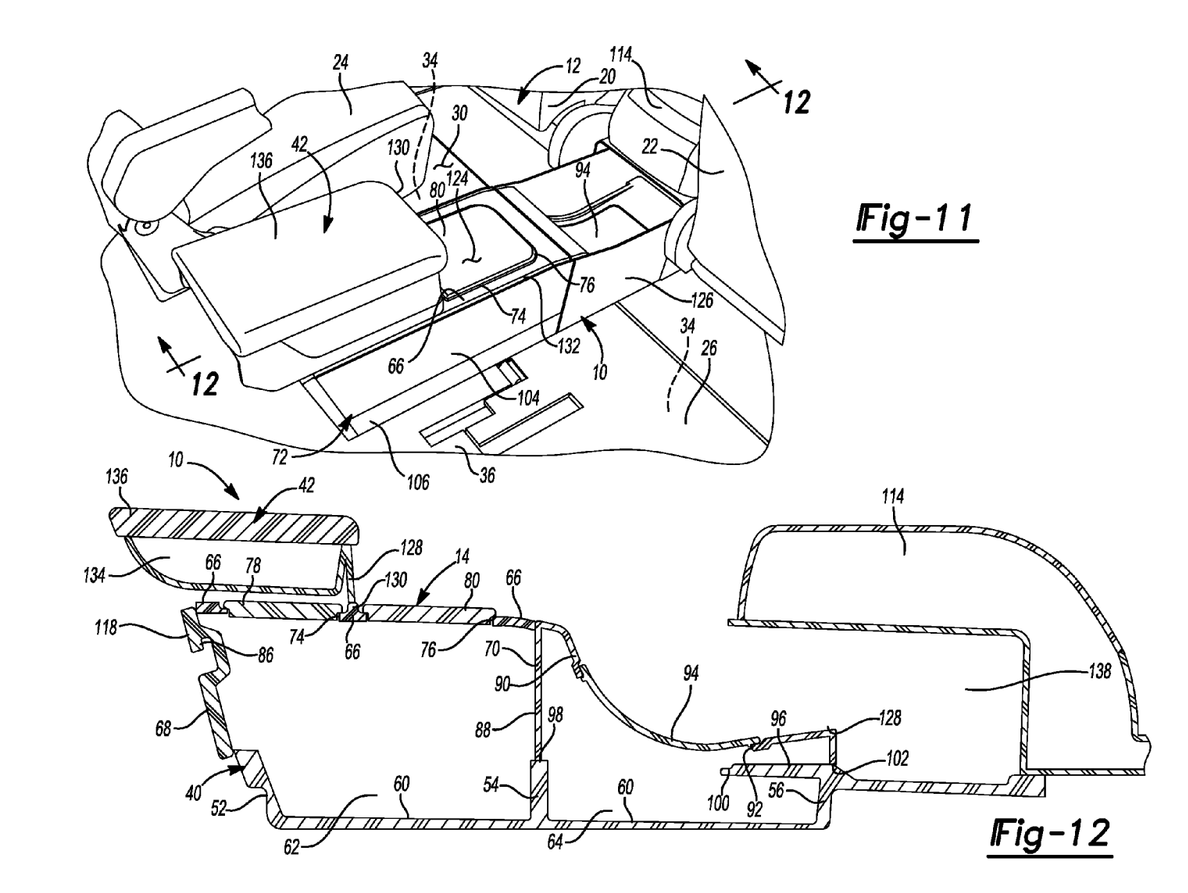
FIG. 11 is a partial perspective view of the vehicle of FIG. 1 showing an armrest of the storage console in a use state.
FIG. 12 is a cross-sectional view of the storage console of FIG. 11 taken along line 12-12 of FIG. 11.

With particular reference to FIGS. 9 and 10, the housing 14 is shown in the upright position with the distal end 98 of the forward panel 70 in contact with the second wall 54 of the support bracket 40 to allow the second wall 54 to support the forward panel 70 when the housing 14 is in the upright position. At this point, the armrest 42 is exposed (FIG. 9) and is bounded by sidewalls 126 associated with the forward panel 70. In this position, the armrest 42 may be moved from a position opposite the top wall 90 to a position above the access door 78 (FIGS. 11 and 12). When the armrest 42 is moved to the position shown in FIGS. 11 and 12 such that the armrest 42 is positioned above the access door 78, the armrest 42 may be positioned between the second-row seats 24 to allow access to the armrest 42 by occupants seated in the second-row seats 24.

The armrest 42 may include a projection 128 that opposes and is in contact with a projection 130 of the top panel 66 when the armrest 42 is disposed above the access door 78. Engagement between the projection 128 and the projection 130 serves to support the armrest 42 when the armrest 42 is positioned above the access door 78. The armrest 42 may be moved from the position opposite the top wall 90 to the position shown in FIG. 12 by sliding the armrest 42 along the housing 14 until the armrest 42 contacts the top panel 66 at the projection 130. Specifically, the armrest 42 may be slideably received within a track 132 (FIG. 4) of the housing 14 to allow the armrest 42 to move relative to and along the housing 14 in a direction along the longitudinal axis 32 of the vehicle 12. The track 132 may facilitate movement of the armrest 42 between the position shown in FIG. 6 and the position shown in FIG. 12.

Figure 13:
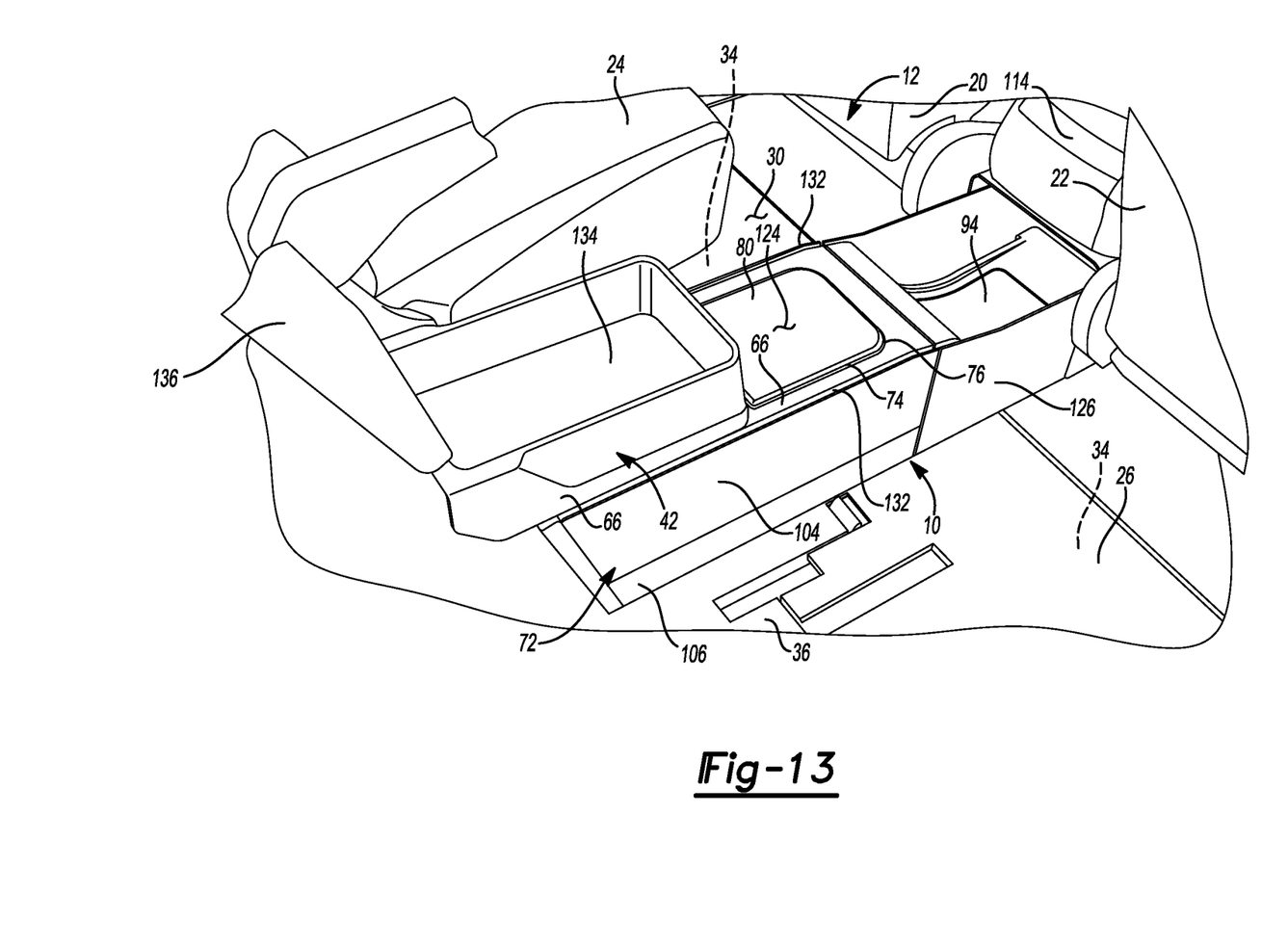
FIG. 13 is a partial perspective view of the vehicle of FIG. 1 showing the storage console in an upright position and an armrest in an open and use position.

The armrest 42 may include a storage area 134 and a lid or cover 136. The lid 136 may be moved from a closed state shown in FIG. 12 to restrict access to the storage area 134 to an open state shown in FIG. 13 to provide access to the storage area 134.

Figure 14:
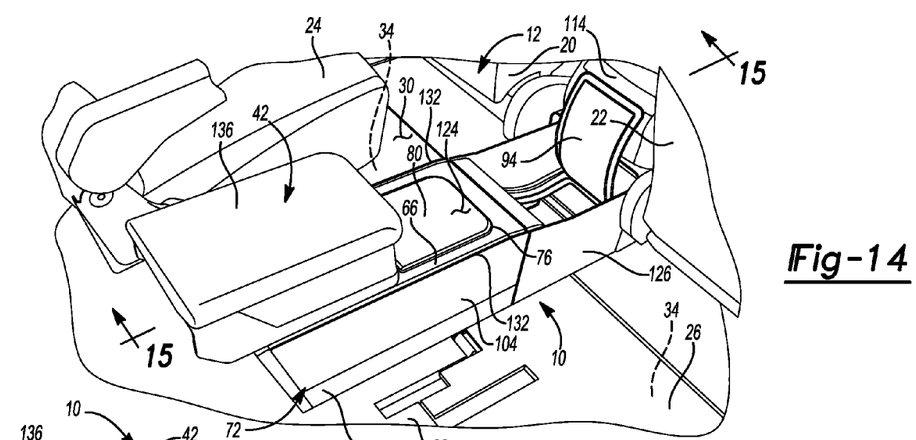
FIG. 14 is a partial perspective view of the vehicle of FIG. 1 showing the storage console in an upright position.

When the armrest 42 is in the position shown in FIG. 12, the access door 94 is exposed. As such, the access door 94 may be moved from a closed state (FIGS. 11, 12) to an open state (FIGS. 14 and 15) to allow access to the second storage area 64. Access to the first storage area 62 may be achieved via the second opening 76 by moving the access door 80 from the closed state to the open state, but is not accessible via the first opening 74, as the access door 78 associated with the first opening 74 is covered by the armrest 42.

As described, cargo may be stored in the first storage area 62 and the second storage area 64 when the housing 14 is in the upright position. Further, cargo may likewise be stored in the storage area 134 of the armrest 42. In addition to the foregoing, items or other cargo may be stored below the armrest 114 in an area 138 (FIG. 12) when the armrest 42 is in the position shown in FIG. 12. While items may be stored within the compartment 138 when the armrest 42 is in the position shown in FIG. 12, any items stored within the compartment 138 must be removed prior to movement of the armrest 42 back into the compartment 138.

The housing 14 may be moved from the upright position to the stowed position by applying a force on the handle 86. The force applied to the handle 86 may disengage the movable walls 106 to allow the movable walls 106 to pivot relative to the fixed walls 104. Applying a force on the handle 86 in a direction opposite to the (W) direction causes the movable walls 106 to move away from one another (FIG. 4) to allow the fixed walls 104 and the movable walls 106 to be received within the first opening 48 and the second opening 50.

Movement of the housing 14 from the upright position to the stowed position is only possible when the armrest 42 is first positioned between the sidewalls 126 such that the armrest 42 opposes the top wall 90. At this point, a force may be applied to the handle 86 opposite to the (W) direction to move the housing 14 concurrently in a direction opposite to the (X) direction and in a direction opposite to the (Z) direction. Sufficient movement of the housing 14 in a direction opposite to the (X) direction and in a direction opposite to the (Z) direction causes the top panel 66 to move the forward panel 70 into the compartment 138 of the armrest 114 and, as a result, causes the top panel 116 to move along the forward panel 70 toward the distal end 98 of the forward panel 70.

When the top panel 66 is in contact with the second wall 54 such that the second wall 54 supports the top panel 66 (FIG. 3) and the top panel 66 is disposed proximate to the distal end 98 of the forward panel 70, the housing 14 is returned to the stowed position and remains in the stowed position until a force is once again applied to the handle 86 in the (W) direction.

What is claimed is:

1. A storage console for a vehicle having a floor, the storage console comprising:
a housing movable from a stowed position disposed beneath the floor to an upright position extending from the floor and defining a first storage area in said stowed position, said housing including side walls that expand a size of said first storage area when said housing is moved into said upright position and a top wall that is substantially flush with the floor when said housing is in said stowed position and is spaced apart from the floor when said housing is in said upright position, said first storage area accessible through said top wall when said housing is in said stowed position and when said housing is in said upright position.

2. The storage console of claim 1, wherein said top wall includes an access panel operable between an open state permitting access to said first storage area and a closed state restricting access to said first storage area.

3. The storage console of claim 2, wherein access to said first storage area is permitted when said access panel is in said open state and said housing is in either of said stowed position or said upright position.

4. The storage console of claim 2, wherein said side walls are substantially perpendicular to said top wall in said upright position.

5. The storage console of claim 1, wherein said side walls move away from one another when said housing is moved from said upright position to said stowed position.

6. The storage console of claim 5, wherein each of said side walls includes a first wall portion fixed for movement with said top wall of said housing and a second wall portion that is pivotably connected to said first wall portion, said second wall portions moving away from one another when said housing is moved from said upright position to said stowed position.

7. The storage console of claim 1, wherein each of said side walls includes a first wall portion fixed for movement with said top wall of said housing and a second wall portion that is pivotably connected to said first wall portion.

8. The storage console of claim 1, further comprising an arm rest supported by said housing.

9. The storage console of claim 8, wherein said arm rest is slidably attached to said housing and is movable from a stowed position to a use position when said housing is in said upright position.

10. The vehicle of claim 1, wherein each of said side walls includes a first wall portion fixed for movement with said top wall of said housing and a second wall portion that is pivotably connected to said first wall portion.

11. The storage console of claim 1, wherein said top wall is substantially parallel to the floor when said housing is in said stowed position and when said housing is in said upright position.

12. A vehicle comprising:
a floor pan defining a floor;
a first seat assembly supported by said floor;
a second seat assembly supported by said floor; and
a storage console disposed between said first seat assembly and said second seat assembly and including a housing movable between a stowed position disposed beneath said floor and an upright position extending from said floor and defining a first storage area in said stowed position, said housing including side walls that expand a size of said first storage area when said housing is moved into said upright position and a top wall that is substantially flush with said floor when said housing is in said stowed position and is spaced apart from said floor when said housing is in said upright position, said first storage area accessible through said top wall when said housing is in said stowed position and when said housing is in said upright position.

13. The vehicle of claim 12, wherein said top wall includes an access panel operable between an open state permitting access to said first storage area and a closed state restricting access to said first storage area.

14. The vehicle of claim 13, wherein access to said first storage area is permitted when said access panel is in said open state and said housing is in either of said stowed position or said upright position.

15. The vehicle of claim 13, wherein said side walls are substantially perpendicular to said top wall in said upright position.

16. The vehicle of claim 12, wherein said side walls move away from one another when said housing is moved from said upright position to said stowed position.

17. The vehicle of claim 16, wherein each of said side walls includes a first wall portion fixed for movement with said top wall of said housing and a second wall portion that is pivotably connected to said first wall portion, said second wall portions moving away from one another when said housing is moved from said upright position to said stowed position.

18. The vehicle of claim 12, further comprising an arm rest supported by said housing.

19. The vehicle of claim 18, wherein said arm rest is slidably attached to said housing and is movable from a stowed position to a use position when said housing is in said upright position.

20. The storage console of claim 12, wherein said top wall is substantially parallel to said floor when said housing is in said stowed position and when said housing is in said upright position.

21. A vehicle comprising:
a floor pan defining a floor;
a first seat assembly supported by said floor;
a second seat assembly supported by said floor; and
a storage console disposed between said first seat assembly and said second seat assembly and including a housing movable between a stowed position disposed beneath said floor and an upright position extending from said floor and defining a first storage area in said stowed position, said housing including side walls that expand a size of said first storage area when said housing is moved into said upright position and a top wall that is substantially flush with said floor when said housing is in said stowed position and is spaced apart from said floor when said housing is in said upright position, said first storage area accessible at said top wall when said housing is in said stowed position and when said housing is in said upright position;
wherein said top wall is substantially parallel to said floor when said housing is in said stowed position and when said housing is in said upright position.

* * * * *